United States Patent [19]

Germain

[11] 3,997,280
[45] Dec. 14, 1976

[54] STATORS OF AXIAL TURBOMACHINES

[75] Inventor: Roger Louis Elysée Germain, Maisons Lafitte, France

[73] Assignee: Societe Nationale d'Etude et de Construction de Moteurs d'Aviation, Paris, France

[22] Filed: June 19, 1975

[21] Appl. No.: 588,141

[30] Foreign Application Priority Data
June 21, 1974  France .............................. 74.22342

[52] U.S. Cl. .............................. 415/189; 415/217; 415/201
[51] Int. Cl.² ........................................... F01D 1/02
[58] Field of Search ...... 415/216, 217, 218, 219 R, 415/189, 199 R, 201

[56] References Cited
UNITED STATES PATENTS

| 2,489,535 | 11/1949 | Montague | 24/285 |
|---|---|---|---|
| 2,995,294 | 8/1961 | Warnken | 415/217 |
| 3,105,281 | 10/1963 | Doherty | 24/285 |
| 3,241,493 | 3/1966 | Frey | 415/199 R |
| 3,291,382 | 12/1966 | Blackhurst et al. | 415/217 |
| 3,326,523 | 6/1967 | Bubo | 415/218 |
| 3,339,833 | 9/1967 | Bill et al. | 415/217 |
| 3,393,436 | 7/1968 | Blackhurst et al. | 415/214 |

FOREIGN PATENTS OR APPLICATIONS

| 234,847 | 3/1945 | Switzerland | 415/189 |
|---|---|---|---|
| 572,859 | 10/1945 | United Kingdom | 415/217 |
| 599,391 | 3/1948 | United Kingdom | 415/217 |

Primary Examiner—Henry F. Raduazo
Attorney, Agent, or Firm—Cameron, Kerkam, Sutton, Stowell & Stowell

[57] ABSTRACT

A stator for turbomachines and especially multistage axial compressors is provided with stationary vanes having peripheral heels secured to a casing. The casing is constituted by a series of coaxial cylindrical annular sections between which are formed annular spaces for inserting and guiding the heels. The sections are rigidly fixed to ring-shaped peripheral webs or flanges which are secured to each other by means of radial longitudinal ribs.

8 Claims, 6 Drawing Figures

STATORS OF AXIAL TURBOMACHINES

This invention relates to multistage stationary or moving axial turbomachines, for example to the axial compressors of aircraft turbojet engines and is more particularly concerned with the structure and mode of construction of the stators of said machines.

The assembly of multistage axial turbomachines and in particular of said compressors is a long and complex operation by reason of the interengagement of the stationary and moving blades and of the need to equip the rotor first in order to balance this latter.

The solutions which are most frequently adopted consist:

either in constructing a stator casing which is demountable in a diametral plane and the two halves of which are fitted with their stationary blades prior to assembly around the rotor, or in constructing a demountable stator casing in the form of a stack of sections; when the rotor has been fitted with its blades and balanced, a first section of the stator is placed in position, the stationary vanes are mounted, whereupon the following section is placed in position and so forth.

These two solutions result in increased weight of the casing, this being due in the case of the first solution to the need to provide joint-plane flanges of substantial thickness in order to retain suitable rigidity of the separated half-stators and in the case of the second solution to the need to provide bolted flanges for the purpose of coupling the sections together. Moreover, this second design solution results in an accumulation of machining tolerances which make it necessary for safety reasons to increase the clearances between stationary blades and moving blades.

For the sake of simplifying the assembly, consideration has also been given to the possibility of so designing the stator casings that the stationary blades can be introduced at the periphery. Since the arrangements according to the invention are not employed, however, it would appear that this third design concept has not been turned to the most profitable account and has been reserved for machines having a small number of stages or for machines having stator discs in coaxial relation with the rotor impellers. In addition, it has apparently not been seen that this third solution permits the use of stator casings in a single unit which is well-suited to machines comprising a large number of stages while considerably facilitating both erection of the assembly and control of the position and state of the blade systems.

It is therefore an aim of the invention:

to provide a turbomachine and especially a multistage axial compressor in which the assembly of the blades and mounting of the rotor within the stator is easy, rapid and reliable, to provide a casing for a multistage turbomachine which is constructed as a single unit and not provided with any joint planes other than those of the end flanges, said casing being thus of much lighter weight than those of the prior art while ensuring the same degree of rigidity, to provide a casing of this type in which machining operations are much less time-consuming and much less costly than those required by turbomachine casings of the prior art.

The stator according to the invention comprises a casing constituted by a series of coaxial cylindrical annular sections between which are formed annular spaces for inserting and guiding heels of stationary vanes, said sections being rigidly fixed to ring-shaped peripheral webs or flanges, the adjacent webs or flanges being secured to each other by means of radial longitudinal ribs. The casing thus has a squirrel-cage structure in which the stationary vanes can readily be placed in position from the exterior by inserting the vane heels within the annular spaces. The interconnection of at least a part of the sections, the webs or flanges and the ribs is carried out by molding or welding.

Further arrangements and advantages of the invention will become apparent from the following description of an exemplified embodiment relating to the stator casing of a multistage axial compressor, reference being made to the accompanying drawings in which.

Figure 1:
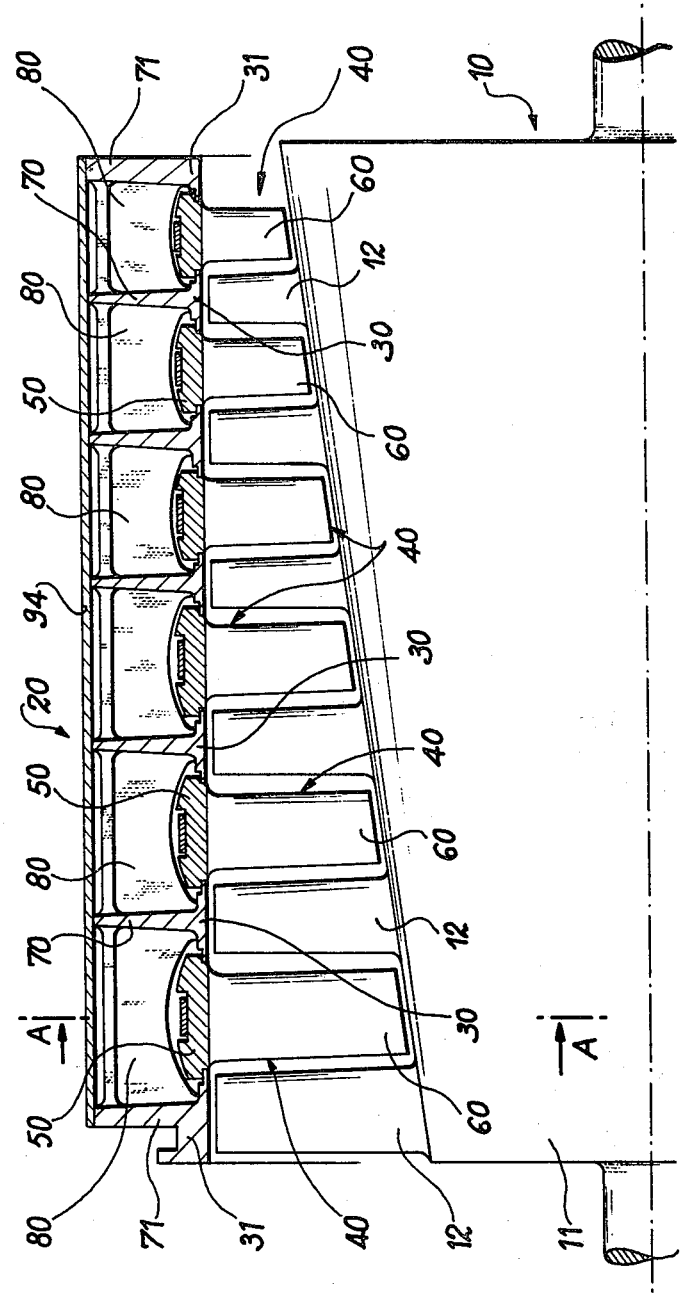
FIG. 1 is a diagrammatic axial half-sectional view of the axial compressor equipped with a stator in accordance with the invention.

The compressor which comprises a stator in accordance with the invention and is shown by way of example in FIG. 1 has six stages. The assembly consisting of the hub 11 of the compressor, of the moving blades 12 and of its rotor 10 is shown in highly diagrammatic form and need not be described in detail in order to gain an understanding of the invention.

The stator casing 20 is constituted by a succession of annular end sections 31 and intermediate sections 30 which are all coaxial and between which are formed annular spaces for the insertion of the stationary vanes 40 at the time of assembly. The intermediate annular sections 30 are rigidly fixed to ring-shaped peripheral webs 70 and the end sections 31 are rigidly fixed to end flanges 71 which are also ring-shaped. The flanges 71 and the webs 70 all have the same external diameter and the stator casing 20 delimits an internal cylindrical space. Each web 70 or flange 71 is joined to the adjacent webs or flanges by a plurality of radial longitudinal ribs 80, with the result that the casing 20 as a whole accordingly constitutes an annular cylindrical structure of the squirrel-cage type. All the stages or only a few of these latter such as, for example, the high-pressure stages of the casing 20 are advantageously surrounded by a sleeve 94 which ensures additional leak-tightness between the machine and the exterior.

Figure 3:
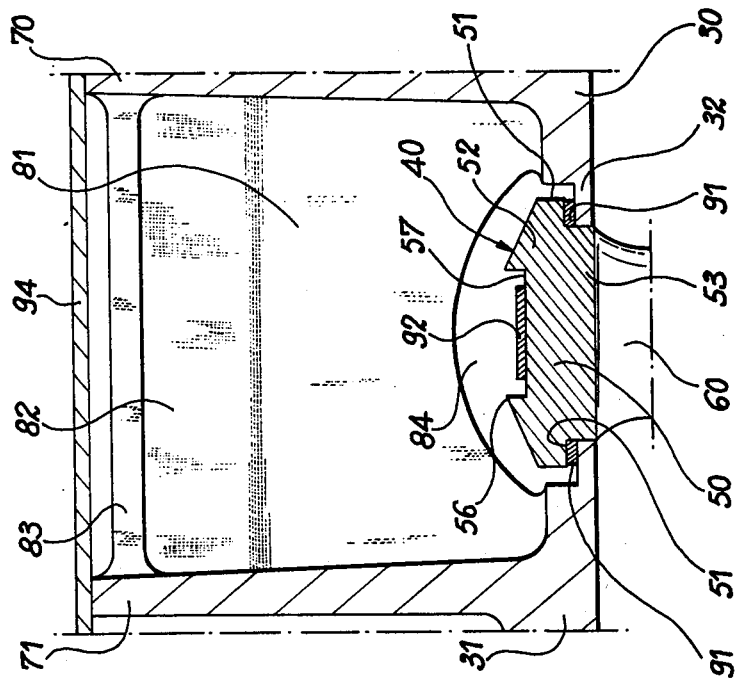
FIG. 3 is a partial axial sectional view to the same scale as FIG. 2 and taken along the plane B—B of FIG. 2.
Figure 2:
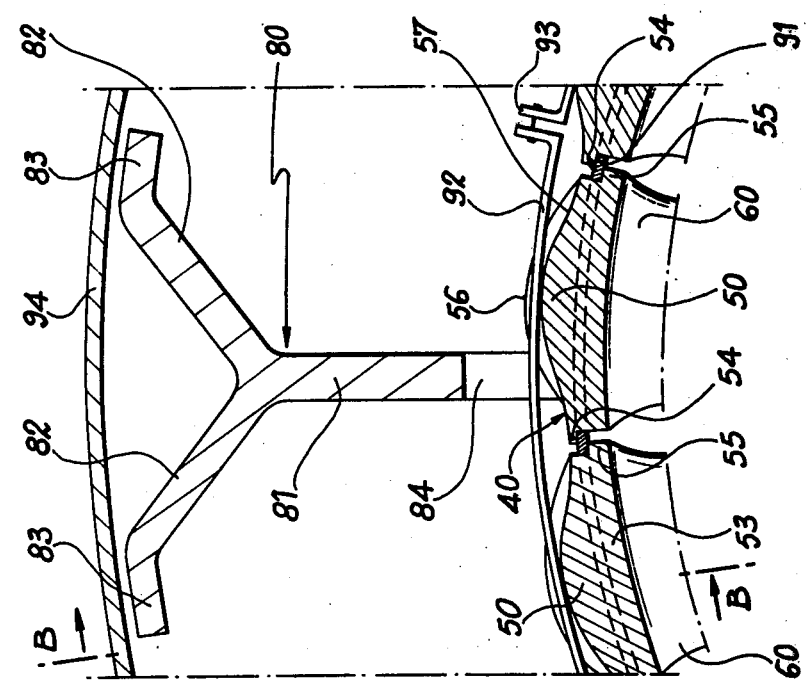
FIG. 2 is a partial diametral sectional view to a larger scale and taken along the plane A—A of FIG. 1.

Reference will now be made to FIGS. 2 and 3 at the same time as to FIG. 1 in order to describe the casing 20 in greater detail and especially in order to explain the method adopted for mounting and securing the stationary vanes 40 of the stator within the annular spaces formed between the annular sections 30, or 30 and 31.

Cylindrical bearing collars 32 (shown in FIG. 3) are formed at the periphery of the annular sections 30 and 31, the heels 50 of the stationary vanes 40 being applied against said bearing collars by means of annular shoulders 51 designed in the form of circular sectors having the same radius as the bearing collars 32. Said stationary vanes 40 are inserted at the periphery and clamped against the bearing surfaces 32 by means of a binding strap 92 which surrounds the heels of all the stationary vanes of a given stage. The heels 50 are therefore made up of two parts, namely peripheral end portions 52 which project substantially by means of the annular shoulders 51 on each side of the annular spaces between the rings 30 and 31, and guides 53 which are inserted in said spaces. The heights of the guides 53 are so determined that the internal faces of said guides which carry the blades 60 of the stationary vanes 40 are brought flush with the wall delimited by the internal bores of the rings 30 and 31.

Leak-tightness of the stationary vanes 40 at the time of assembly is ensured by seals 91 (shown in FIG. 2) which surround the guides 53 and are inserted on the one hand between the annular shoulders 51 and the cylindrical bearing collars 32 and on the other hand between noses 54 (shown in FIG. 3) which project tangentially on one side of the peripheral end portions 52 and noses 55 which project from the guides 53 in the opposite tangential direction.

The ribs 80 have a transverse section in the shape of a Y, the stem 81 of which is oriented in an axial plane. This shape endows the squirrel-cage structure of the casing with excellent torsional rigidity. The arms 82 of the Y have flattened ends 83 which project from the external contour of the webs 70 and the flanges 71, thus making it possible to pass a sleeve 94 around the entire stator casing 20 or only around the high-pressure stages, said sleeve being intended to achieve enhanced leak-tightness as well as sound insulation if so required.

In that portion of the ribs 80 which constitutes the stem 81 of the Y are formed clearance openings 84 (FIG. 2) which serve to introduce the heels 50 into those portions of the annular spaces which are placed opposite to the ribs.

The external faces 56 of the heels 50 are of domical shape. Peripheral channels 57 each having a cambered bottom portion are formed (as shown in FIG. 3) in such a manner as to guide the binding straps 92. The clamping action of said straps is produced by means of at least one bolt (not shown) which draws together the two adjacent clamping flanges 93 of the strap 92. A single strap has been shown in FIG. 3 for the sake of enhanced simplicity.

As will be readily understood, the invention is not limited to the means which have just been described in regard to the attachment of the vanes 40.

Figure 4:
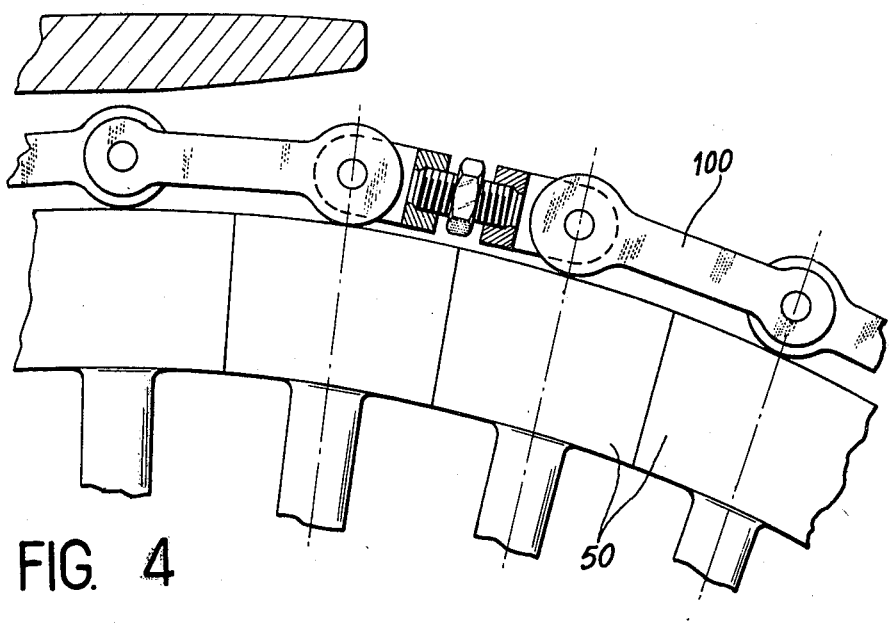
FIG. 4 illustrates an alternative mode of attachment of the vanes shown in the previous figures.
Figure 5:
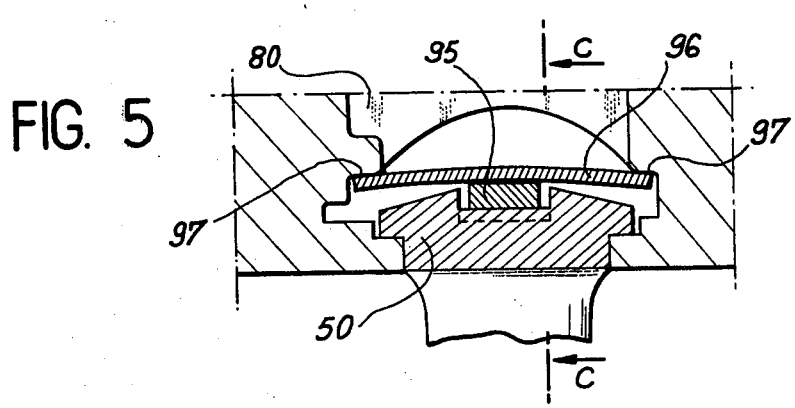
FIGS. 5 and 6 illustrate yet another alternative mode of attachment of the vanes shown in the previous figures.
Figure 6:
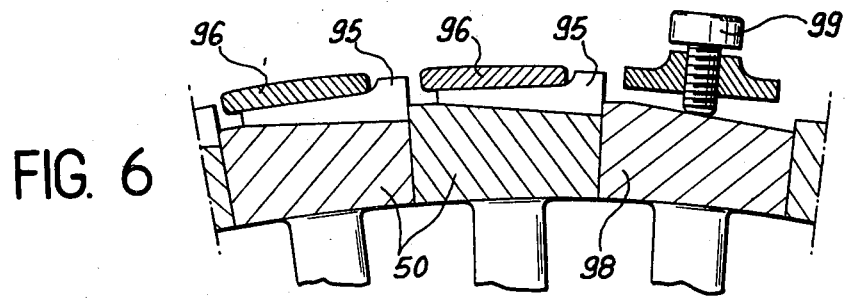

From this it follows that, instead of the binding straps 92, provision could be made for clamping means such as articulated chains (shown in FIG. 4) of the bicycle transmission-chain type or alternatively for locking means such as wedges (shown in FIGS. 5 and 6).

In the case of articulated chains, the number of links of a chain which is generally designated by the reference 100 in FIG. 4 can advantageously be equal to or a multiple of the number of vanes. It should be noted that the assembly of an articulated chain is easier than that of a strap. In addition, an articulated chain is capable of applying larger and more uniform forces to the vanes 40 in spite of the random variations in thickness of the heels 50.

In the event that the vanes 40 are locked in position by means of wedges, each wedge can be so arranged as to lock a single vane in position or alternatively to lock a number of vanes in position at the same time. A method of this type for securing the vanes 40 by means of wedges is illustrated respectively by means of the partial diametral cross-sectional view of FIG. 5 and by means of the partial axial sectional view of FIG. 6, this view being taken along the line C—C of FIG. 5. In accordance with this mode of attachment, the heel 50 of the vane 40 is secured by an individual wedge 95 having a small angle of slope, said wedge being inserted between a heel 50 and a plate 96 which is engaged within two circular grooves 97. The plate 96 can be of deformable mild steel having substantial elongation, thus making it possible to reduce the machining tolerances which are necessary by reason of the fact that the elastic limit can be exceeded at the time of assembly. In the case illustrated in FIG. 6, the order of assembly takes place in the clockwise direction, namely from left to right, each wedge 95 being stopped by the vane assembly which is located on the right-hand side of this latter, that is to say which is mounted immediately after. The vane 98 is mounted last and is not fitted with wedges but with a means such as a screw 99.

A few indications will now be given in regard to the manufacture and assembly of the machine which comprises a stator in accordance with the invention.

The stator casing 20 can be constituted by the bolted assembly of annular sections in which the planes of assembly pass, for example, through the central diametral planes of the webs 70, said sections being in turn formed either by molding or by welding. It is apparent, however, that the structure of the casing in accordance with the invention lends itself extremely well to manufacture in the form of sectional assemblies which constitute a single unit and even to the manufacture of the entire casing in a single unit, for example by molding or welding or alternatively by welding of molded sub-assemblies.

Whatever solution is adopted, the assembled casing is then machined by turning on a lathe and in a single pass, the periphery of the webs 70 and flanges 71, the internal wall of the annular sections 30 and 31 (shown in FIG. 1), the cylindrical bearing collars 32 (shown in FIG. 3) as well as the flat faces of the sections which delimit the annular passages for mounting the vanes. Easy and rapid machining is therefore permitted by the invention. In order to assemble the compressor, the rotor 10 fitted with its blades 12 is first inserted in the casing 20, whereupon the stationary vanes 40 fitted with seals 91 are introduced through the spaces formed by the webs 70, the flanges 71 and the ribs 80. Assembly of the blades is greatly facilitated by the ease of access of the passages between the bearing collars 32. Finally, the sleeve 94 is passed over the stator assembly and fixed in position.

It will be noted:

that it is possible to mount the vanes 40 in groups of vanes which have already been assembled by welding or casting, that the assembly of the different stages of stationary vanes can be carried out in any desired order, that the clearances between the heels 50 of a given stage can readily be distributed, that assembly of the last vane of any one stage is carried out without difficulty by inserting said vane crosswise, the guiding nose 55 of said vane being inserted beneath the adjacent end-portion nose 54, then by correcting the position of the vane so as to ensure that its nose 54 is placed on the guiding nose 55 of the other adjacent vane, that leak-tightness can readily be ensured by suitable adjustment of the straps 92, the chains 100 or the wedges 95, that control of leakages and leak detection are greatly facilitated by the fact that the rings 30 and 31 constitute separate chambers in conjunction with the webs 70 and the flanges 71, that the axial clearances between moving blades 12 and stationary vanes 40 are measurable at any stage of assembly without any difficulty, finally that inspection, during overhaul, of the state of a stage of stationary or moving blades requires only partial disassembly without any need to remove the rotor.

What we claim is:

1. A monoblock stator casing for a multistage axial compressor in which stationary vanes are anchored to the stator casing by peripheral heels, said casing including a series of coaxial cylindrical annular sections which define annular spaces between said sections, heels of said stationary vanes being inserted and circumferentially guided in said spaces, said sections being rigidly fixed to ring-shaped peripheral webs, adjacent ones of said webs being secured to each other by radial longitudinal ribs, said heels of said vanes each having a peripheral end portion of substantially greater width than the corresponding one of said annular spaces and the edges of said end portions being abuttingly engaged by means comprising a centripetal-action clamping device against the ends of the sections which define said space and clearance openings for positioning and sliding of said heels within the annular spaces at the level of said ribs.

2. A stator according to claim 1, wherein said annular sections, said webs and said ribs are joined by molding and also by welding.

3. A stator according to claim 1, wherein said clamping device is a stretched strap surrounding the stationary-vane heels.

4. A stator according to claim 1, wherein said clamping device is an articulated chain surrounding the stationary-vane heels.

5. A stator according to claim 1, wherein said clamping device is a set of wedges and plates surrounding the stationary-vane heels.

6. A stator according to claim 1, including a seal which surrounds the heel of each vane between the end portion and the annular-section extremities against which the end portion is abuttingly applied.

7. A stator according to claim 1, said longitudinal ribs having a Y-shaped cross-section wherein the stem of said Y is along the axis of the compressor and the arms of the Y are towards the periphery of the compressor.

8. A stator according to claim 1, at least a part of the webs and flanges being in a cylindrical sleeve.

* * * * *